US006434174B1

(12) United States Patent
Hager et al.

(10) Patent No.: US 6,434,174 B1
(45) Date of Patent: Aug. 13, 2002

(54) REPETITIVELY PULSED Q-SWITCHED CHEMICAL OXYGEN-IODINE LASER

(75) Inventors: Gordon D. Hager; Laverne A. Schlie; Robert D. Rathge; Robert F. Shea, all of Albuquerque, NM (US)

(73) Assignee: United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 06/785,186

(22) Filed: Oct. 7, 1985

(51) Int. Cl.[7] ................................................ H01S 3/113
(52) U.S. Cl. ........................................... 372/11; 372/25
(58) Field of Search ............................. 372/11, 98, 18, 372/19, 20, 25

(56) References Cited

U.S. PATENT DOCUMENTS

| 3,464,024 A | 8/1969 | Bell et al. |
| 3,514,714 A | 5/1970 | Angelbeck |
| 3,729,724 A | 4/1973 | Ahearn et al. |
| 4,126,833 A | 11/1978 | Hundstad et al. |
| 4,210,877 A | 7/1980 | Pleasance et al. |
| 4,350,661 A | 9/1982 | Davis et al. |
| 4,435,808 A | * 3/1984 | Javan ........................ 372/11 |

OTHER PUBLICATIONS

Wiswall, C. E. et al, "Operation of an IC1 fueled oxygen--iodine chemical laser," *Appl. Phys. Lett.*, 45 (1), Jul. 1, 1984, pp 5–7.
Bernard, D. J. et al, "Efficient operation of a 100–W transverse–flow oxygen–iodine chemical laser," *Appl. Phys. Lett.*, 34 (1), Jan. 1, 1979, pp 40–41.
Gross, R. W. F. et al, *Handbook of Chemical Lasers*, published by John Wiley and Sons, New York, 1976, chapter 12, pp 670–701.

* cited by examiner

*Primary Examiner*—Gene Wan
(74) *Attorney, Agent, or Firm*—Jacob N. Erlich; Donald J. Singer

(57) ABSTRACT

A repetitively pulsed chemical oxygen-iodine laser having a resonant cavity containing a lasing medium in the form of a flowing mixture of excited oxygen and iodine atoms and an iodine absorption region within the resonant cavity. The iodine absorption region includes a source of iodine atoms and a magnetic field associated therewith. Selectively altering the magnetic field results in changing the absorption characteristics of the iodine atoms and therefore effectively pulses the output of the laser.

15 Claims, 3 Drawing Sheets

REPETITIVELY PULSED Q-SWITCHED CHEMICAL OXYGEN-IODINE LASER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to chemical oxygen-iodine lasers, and, more particularly to a repetitively pulsed chemical oxygen-iodine laser in which the threshold of the resonator is reduced by the incorporation therein of a scaleable intracavity gas phase Q-switch.

It is well recognized in the art that photochemical iodine lasers are capable of generating pulsed emission of very short duration and high energy. Examples of such photochemical iodine lasers can be found in the "Handbook of Chemical Lasers," edited by R. W. F. Gross and J. F. Bott, John Wiley and Sons, New York, 1976, chapter 12, pages 670–701. In the photochemical iodine laser the population inversion is produced in the flash photolysis of a parent alkyl-iodide, generally $C_3F_7$—I or $CF_3$—I. The iodine atom that is produce in the photolysis process is in the upper laser level, $^2P_{1/2}$.

High energy pulsed lasers of this type require large stores of electrical energy and generally operate at efficiencies of less than a few percent. In recent years a new type of iodine laser, the chemical oxygen iodine laser, COIL, has been under development. In this laser the population inversion is produced by energy transfer from excited molecular oxygen in the $O_2(^1\Delta)$ state. In the most recent development stages the emphasis has been placed on supersonic chemical oxygen iodine lasers. In the supersonic mode thermally induced medium effects and their influence on beam quality are much smaller by comparison with subsonic operation. In subsonic operation of the COIL under loaded cavity conditions power extraction with its attendant heat release occurs so rapidly that unacceptable density variations are produced in the flow direction. Supersonic operation of coil lasers, however, requires the generation and transport of $O_2(^1\Delta)$ at high pressure (>10 torr) which is difficult.

It would therefore be highly desirable to be able to effectively utilize the low pressure generator technology and subsonic flow in chemical oxygen-iodine lasers in which the aerodynamic problems associated with supersonic flow would be much less critical.

SUMMARY OF THE INVENTION

The present invention overcomes the problems of severe flu induced density gradients in a continuous wave subsonic cavity of a chemical oxygen-iodine laser by operating the laser in a repetitively pulsed mood through the incorporated therein of a scaleable intracavity gas phase Q-switch.

In the present invention, the extraction volume defined by the resonator of the chemical oxygen-iodine laser is filled during the interpulse time with a thermally uniform gain medium. Once the optical mode volume is filled, laser action is triggered by reducing the threshold of the resonator with a scaleable intracavity gas phase Q-switch. For subsonic flow, cavity volumetric exchange times are on the order of milliseconds, whereas pulse extraction times due to the large magnitude of the $O_2(^1\Delta)/I$ transfer rate are on the order of microseconds. During the laser pulse, the medium is essentially stationary with temporal density variations caused by the flux induced temperature rise occurring uniformly over the optical aperture. Thus, by operating the laser at subsonic velocity in a repetitively pulsed mode the single most critical issue, that of medium quality and its effect on beam quality, is substantially reduced. In addition, the short duration, high intensity pulses produced in this particular mode of operation offers significant advantages in terms of propagation, target interaction effects, and the potential for frequency doubling when compared with lower average power CW operation.

The peak power enhancements in the repetitively pulsed mode of operation of the chemical oxygen-iodine laser of the present invention come about as a direct result of the relatively long radiative and collisional lifetimes of the $^2P_{1/2}$ state which permits efficient accumulation of energy within the resonant cavity during the switch off portion of the cycle. The particular intracavity gas phase switch arrangement of this invention is based upon the application of the Zeeman effect.

The present invention encompasses several alternative embodiments utilizing the repetitively pulsed Q-switch mode of operation. In each of these concepts the resonant cavity input flow is continuous and an iodine atom absorption region is placed intracavity and collinear with the optical axis of the laser. The absorption regions are configured with magnetic oils that produce fields which are parallel to the optical axis of the laser. When the magnetic field is off the absorption region counteracts the laser region and oscillation does not occur. In all of these concepts $O_2(^1\Delta)$, i.e., oxygen, and $I_2$, iodine, are supplied continuously to the cavity region.

In the preferred embodiment of the present invention the absorbing iodine atoms are produced in a separate chemical oxygen-iodine generator. This absorption region is coupled directly to the chemical oxygen-iodine gain region. Repetitive pulse operation occurs by first allowing the gain region to fill with fresh media when the field is off. Once the extraction volume is filled, a fast rising current pulse is applied to the field coils producing transparency in the absorption region. With the gain medium essentially stationary a short duration high intensity pulse is then extracted from the gain region. The peak intensity and pulse width are determined by the concentrations of $O_2(^1\Delta)$ and iodine atoms.

In an alternate embodiment of the present invention the iodine atoms are produced in a heated cell from thermal dissociation of $I_2$. The heated cell is configured with a solenoid that produces an axial magnetic filed. The heated cell is then repetitively pulsed modulating the absorption and producing a train of laser pulses in the manner set forth above. In a further alternate embodiment of the present invention, the natural build-up and decay of the subsonic gain profile is utilized. The gain region is folded within the resonator through the absorption region. In the absorption region the subsonic flow passes through the solenoid field coils. When the gain is positive in the upstream section the absorption in the downstream section is reduced by applying a current pulse to the solenoid. Net gain is established in the resonator and the energy in the upstream section of the flow is extracted in a short duration laser pulse.

It is therefore an object of this invention to provide a repetitively pulsed Q-switched chemical oxygen-iodine laser.

It is another object of this invention to provide a repetitively pulsed Q-switched chemical oxygen-iodine laser which incorporates therein the use of a magnetic gas phase optical switch.

It is a further object of this invention to provide a repetitively pulsed Q-switched chemical oxygen-iodine laser in which the absorption region can be coupled directly to the gain region without the addition of material windows.

It is still a further object of this invention to provide a repetitively pulsed Q-switched chemical oxygen-iodine laser in which pulse power requirements are minimal.

It is an even further object of this invention to provide a repetitively pulsed Q-switched chemical oxygen-iodine laser which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawings and its scope will be pointed out in the appended claims.

DETAILED DESCRIPTION OF THE PREFERRED EMBODIMENTS

Figure 1:
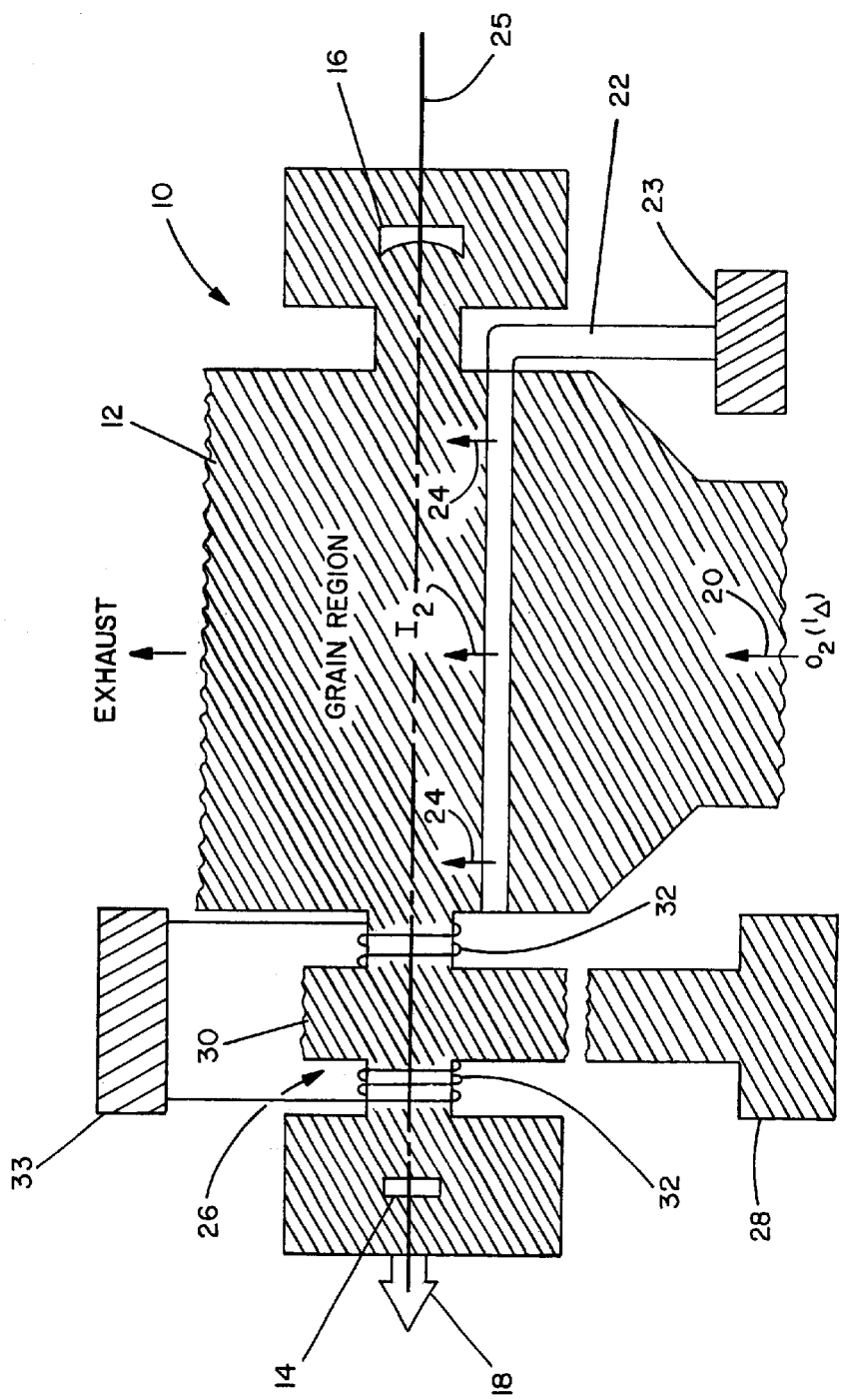
FIG. 1 is a schematic illustration of the repetitively pulsed Q-switched chemical oxygen-iodine laser of this invention.

Reference is now made to FIG. 1 of the drawings which represents schematically the laser 10 of the preferred embodiment of this invention. In laser 10 the resonant cavity 12 is depicted as having a pair of spaced apart mirrors 14 and 16, one of which, 14, is partially transmissive so as to enable the output of the laser beam 18 to pass therethrough. Oxygen, $O_2(^1\Delta)$, is continuously fed into the resonant cavity 12 from any suitable source (not shown) and as indicated by arrow 20. Iodine, $I_2$, is injected into the resonant cavity 12 by means of a conventional injector 22 connected to any suitable iodine source 23. Arrows 24 are indicative of the iodine flow. Within resonant cavity (or gain region) 12 the excited oxygen and iodine atoms combine to form the lasing or gain medium.

Laser 10 of the present invention is operated in the repetitively pulsed mode. In this type of operation the extraction volume defined by the resonant cavity 12 is filled during the interpulse time with the thermally uniform gain medium. Once the optical mode volume is filled, laser action is triggered by reducing the threshold of the resonant cavity 12 by the use of a scalable intracavity gas phase switch 26. The intracavity gas phase switch 26 defines an iodine absorption region situated within a pulsed magnetic filed and is placed intracavity and collinear with the optical axis 25 of the resonant cavity 12. As illustrated in FIG. 1 of the drawings the absorbing iodine atoms are produced in a separate oxygen-iodine generator 28 by the interaction of molecular iodine and excited oxygen. From oxygen-iodine generator the absorbing iodine atoms are fed into the absorption region 30. The absorption region 30 has encompassed therearound a series of magnetic oils 32 that produce fields which are parallel to the optical axis 25 of laser 10. Any suitable power source such as conventional pulsed power modulator 33 is interconnected to coils 32. When the magnetic field is off the absorption region 30 counteracts the laser gain and oscillation within the resonant cavity does not occur.

More specifically, for subsonic flow, cavity volumetric exchange times are in the order of milliseconds, whereas pulse extraction times due to the large magnitude of the $O_2(^1\Delta)/I$ transfer rate are on the order of microseconds. During the laser pulse the gain medium is essentially stationary with temporal density variations caused by the flux induced temperature rise occurring uniformly over the optical aperture. Thus, by operating subsonic in a repetitively pulsed mode the single most critical issue, that of medium quality and its effect on beam quality is eliminated. In addition, the short duration, high intensity pulses produced in this mode of operation may offer significant advantages in terms of propagation, target interaction effects, and the potential for frequency doubling when compared with lower average power CW operation. The peak power enhancements and repetitively pulsed mode of operation are a direct result of the relatively long radiative and collisional lifetimes of the $^2P_{1/2}$ state which permits efficient accumulation of energy within the cavity during the switch-off portion of the cycle.

The spin orbit states of atomic iodine are characterized by the spectroscopic term symbols $^2P_J$ with J=½ for the upper state and J=3/2 for the lower state. The quantum number J defines the electronic angular momentum of the atom. At the same time, the $^{127}I$ nucleus exhibits a nuclear spin of I=5/2. The total angular momentum vector (quantum number of the atom, F) is formed by the quantum mechanical vector addition of the quantum numbers J and I as follows:

$$F=I+J, I+J-1, \ldots I-J \qquad (1)$$

For the upper laser level J=½, there are then two possible values, F=3,2. For the lower laser level, however, there are four possible values, F=4, 3, 2, 1. The optical selection rules governing transitions between different hyperfine levels are given by $\Delta F=0,\pm1$, and $\Delta M_F=0,\pm1$. Six separate transitions are then possible. In the presence of a magnetic field, however, the degeneracies of the hyperfine energy levels are lifted and each is replaced by 2F+1 spatially quantized components according to the magnetic quantum number $M_F$. The dominant F=3→4 transition then splits into 21 components. The splitting of the levels causes a dilution of the level population densities. This effect, coupled to the lower transition moments computed for transitions between Zeeman components, relative to those observed for zero field transitions between hyperfine levels, forms the basis of the Q-switching approach to the respectively pulsed operation of the chemical oxygen-iodine laser of the present invention.

During the field on phase of the switch cycle the absorption region 30 becomes largely transparent to the laser radiation and oscillations will occur, however, during the field off-phase, the absorption region 30 acts as a loss element which precludes oscillation, thereby allowing energy storage within the gain medium. The time between pulses is given by the ratio of extraction width, W, and flow velocity, V. The extraction width is limited by the width of the gain envelope, $W_{MAX}$. The minimum achievable pulse repetition frequency is then given by the following formula:

$$PRF_{MIN}=V/W_{MAX} \qquad (2)$$

Stated more succinctly, during operation, the oxygen, $O_2(^1\Delta)$, and iodine, $I_2$, are supplied continuously to the resonant cavity 12. The absorbing iodine atoms are produced in the separate oxygen-iodine generator 28 and fed into the absorption region 30 of the intracavity gas phase switch 26. The dwell time between the point of $I_2$ injection into the primary oxygen stream is made sufficiently long such that most of the atoms are in the absorbing $^2P_{2/3}$ state by the time the flow reaches the magnetic field region. The absorption region 30 is then coupled directly to the oxygen-iodine gain region 12 as shown in FIG. 1 of the drawings. Repetitive pulsed operation then occurs by first allowing the gain region to fill with fresh media with the field off. Once the extraction volume is filled a fast rising current pulse is applied by means of field coils 32 to the absorption region 30. With the gain medium essentially stationary a short duration high intensity output pulse 18 is then extracted from the resonant cavity 12.

The peak intensity and pulse width are determined by the concentrations of $O_2(^1\Delta)$ in the iodine atoms. After the laser pulse 18 has been extracted, the magnetic field current is turned off and the resultant absorption prevents oscillation from occurring while the spent media is exhausted and fresh media enters the resonant cavity 12. The whole process is then repeated with a train of short duration high intensity pulses being extracted from the continuous flow of oxygen and iodine within the resonant cavity 12 of laser 10.

Figure 2:
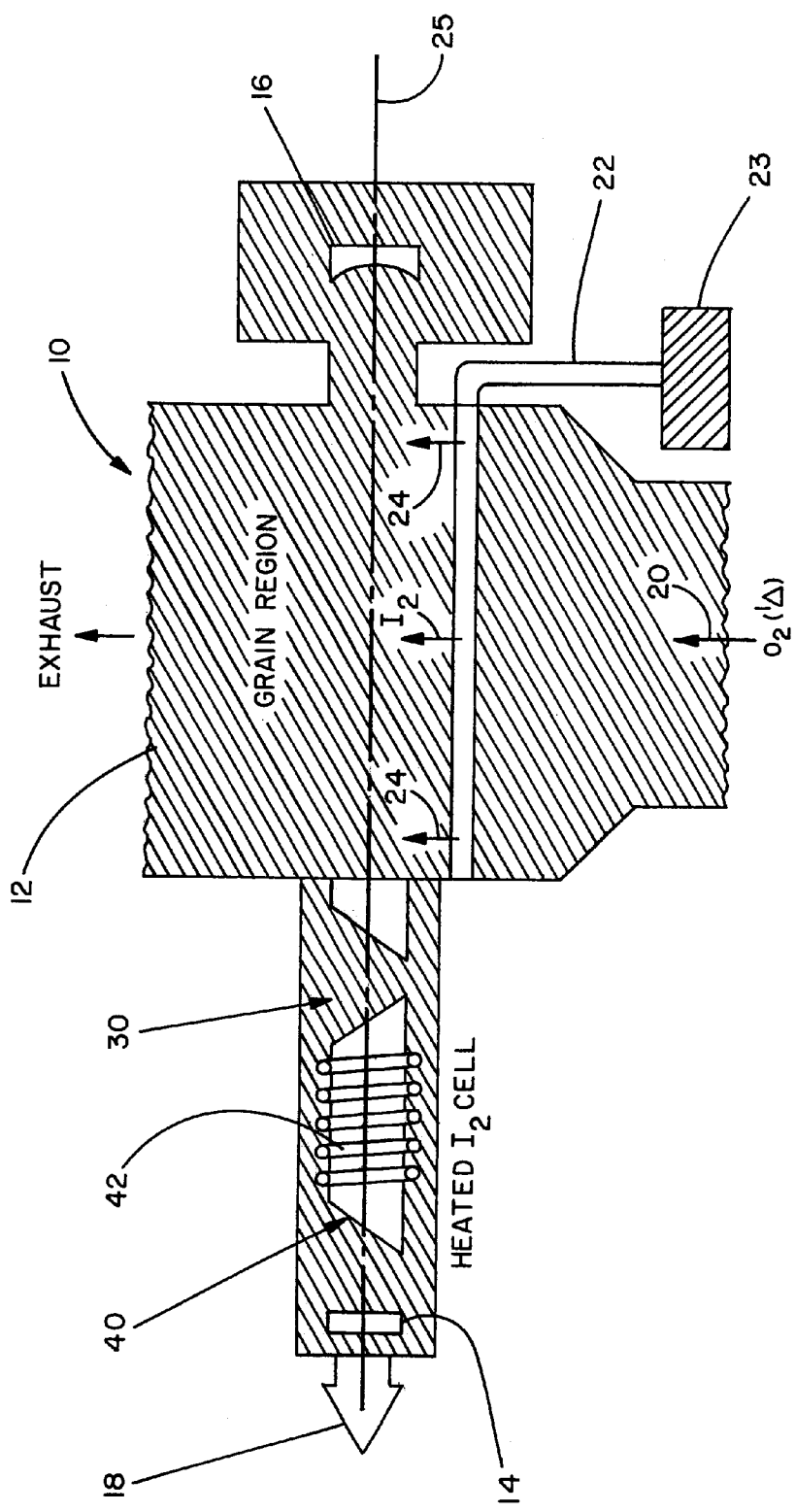
FIG. 2 is a schematic illustration of an alternate embodiment of the repetitively pulsed Q-switched chemical oxygen-iodine laser of this invention.

An alternative embodiment of the present invention is illustrated in FIG. 2 of the drawings. Since many of the components utilized with the laser 10' of FIG. 2 are the same as utilized with laser 10 like numerals will be utilized therein to represent identical elements to those found in FIG. 1 of the drawings. In FIG. 2 of the drawings the laser is represented by 10' and incorporates therein an iodine absorption region 30'. Within the embodiment of FIG. 2, a heated cell 40 is utilized to produce the iodine atoms through a conventional procedure of thermal dissociation of $I_2$ (molecular iodine). The heated cell 40 is configured with a solenoid 42 therearound that produces an axial magnetic field. The heated cell 40 is then repetitively pulsed modulating the absorption and producing a train of output laser pulses 18 as discussed with respect to the operation of laser 10 shown in FIG. 1 of the drawings.

Figure 3:
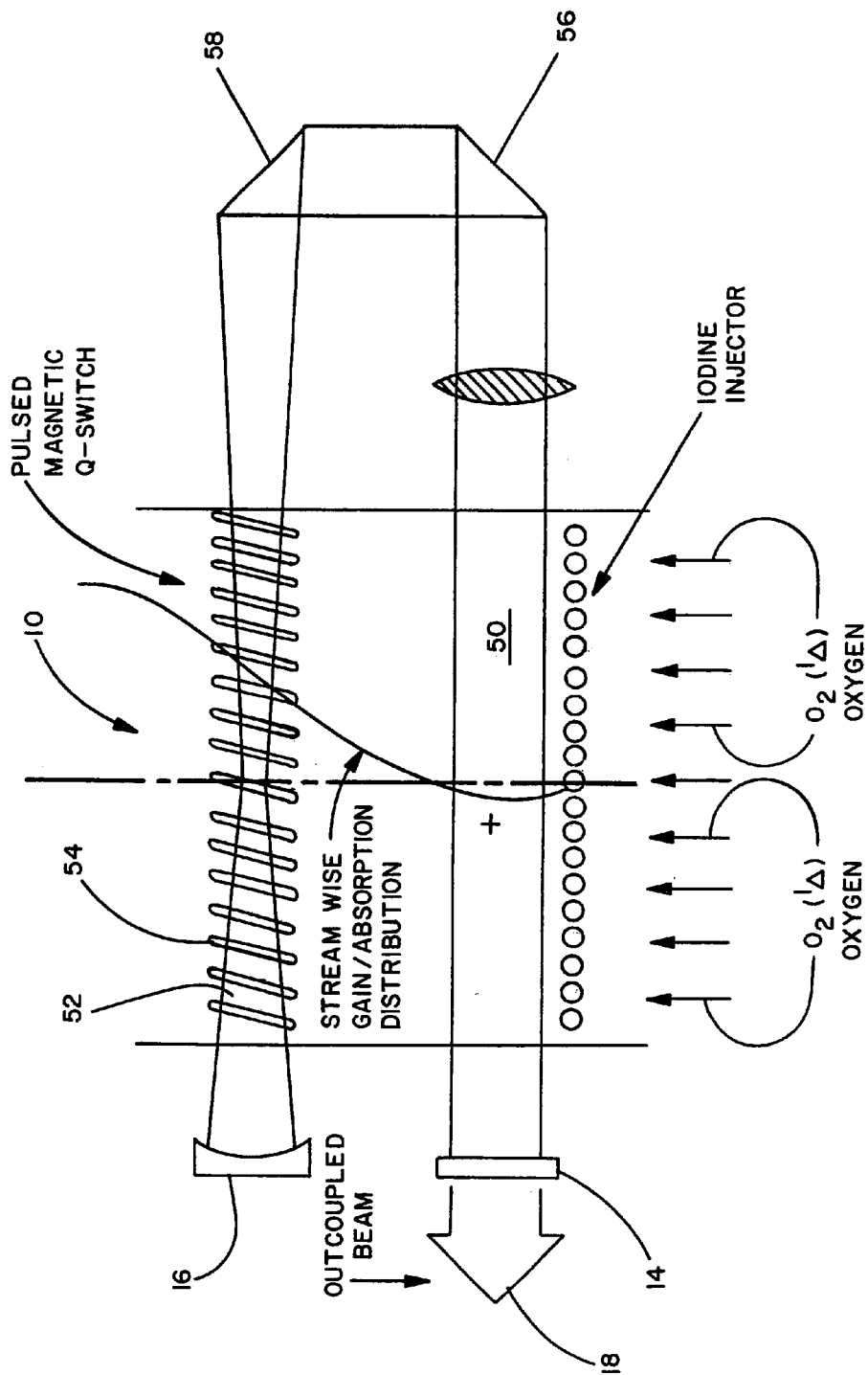
FIG. 3 is a schematic illustration of a further alternate embodiment of the repetitively pulsed Q-switched chemical oxygen-iodine laser of this invention.

A further alternate embodiment of the present invention is depicted schematically in FIG. 3 of the drawings. In the configuration set forth in FIG. 3 of the drawings, the natural build-up and decay of the subsonic gain profile is utilized. In FIG. 3 of the drawings the laser is donated by numeral 10" and containing a gain or amplification region 50 and an absorption region 52. The gain region of 50 is folded through the absorption region 52. In the absorption region 52, the subsonic flow passes through a solenoid field coil 54. When the gain is positive in the upstream section, the absorption in the downstream section is reduced by applying a current pulse to solenoid 54. Net gain is established in the resonator bounded by mirrors 14 and 16 and mirrors 56 and 58 similar to the operation of lasers 10 and 10' and the energy in the upstream section of the flow is extracted in a short duration laser pulse 18. The gain and absorption region 50 and 52, respectively, are then refilled and then the whole process is repeated similar to the operation of lasers 10 and 10' in FIGS. 1 and 2, respectively, of the drawings.

All of the three embodiments of the present invention involve the use of a scalable gas phase magnetic switch based on the Zeeman effect in atomic iodine. In all three cases a train of short duration high intensity pules are extracted from a continuous flow of oxygen and iodine by modulating intracavity atomic iodine absorption with a magnetic field.

Although this invention has been described with reference to particular embodiments, it will be understood that this invention is also capable of further and other embodiments within the spirit and scope of the appended claims.

We claim:

1. A repetitively pulsed chemical oxygen-iodine laser, comprising:

a resonant cavity defined by a pair of optically aligned reflecting surfaces;

a laser medium situated within said resonant cavity, said lasing medium being in the form of a flowing mixture of excited oxygen and iodine atoms, and said flowing mixture of oxygen and iodine producing a laser action within said resonant cavity resulting in a laser beam being output therefrom; and means situated within said resonant cavity for controlling absorption within said resonant cavity in order to pulse said laser beam output, said absorption controlling means including means for producing iodine atoms within an absorption region and means operably associated with said iodine atoms within said absorption region for providing a controllable magnetic field in communication therewith;

wherein application of said magnetic field produces transparency within said absorption region and induces said pulsed laser beam output.

2. A repetitively pulsed chemical oxygen-iodine laser as defined in claim 1 wherein said absorption controlling means further comprises a coil of wire for producing said magnetic field and means operably connected to said coil for controlling the strength of said magnetic field.

3. A repetitively pulsed chemical oxygen-iodine laser as defined in claim 1 wherein one of said reflecting surfaces is partially transmissive and said laser beam is output therefrom.

4. A repetitively pulsed chemical oxygen-iodine laser as defined in claim 3 wherein said absorption controlling means is located adjacent said partially transmissive reflective surface.

5. A repetitively pulsed chemical oxygen-iodine laser as defined in claim 4 wherein said absorption controlling means further comprises a coil of wire for producing said magnetic field and means operably connected to said coil for controlling the strength of said magnetic field.

6. A repetitively pulsed chemical oxygen-iodine laser as defined in claim 1 wherein said means for producing iodine atoms comprises a chamber in which molecular iodine interacts with excited oxygen.

7. A repetitively pulsed chemical oxygen-iodine laser as defined in claim 6 wherein said absorption controlling means further comprises a coil of wire for producing said magnetic field and means operably connected to said coil for controlling the strength of said magnetic field.

8. A repetitively pulsed chemical oxygen-iodine laser as defined in claim 1 wherein said means for producing iodine atoms comprises a heated cell capable of thermally disassociating molecular iodine.

9. A repetitively pulsed chemical oxygen-iodine laser as defined in claim 8 wherein said absorption controlling means further comprises a coil of wire for producing said magnetic field and means operably connected to said coil for controlling the strength of said magnetic field.

10. A repetitively pulsed chemical oxygen-iodine laser as defined in claim 1 wherein said resonant cavity comprises an amplification region and an absorption region and wherein said iodine atoms of said absorption controlling means are located in said absorption region of said resonant cavity.

11. A repetitively pulsed chemical oxygen-iodine laser as defined in claim 10 wherein said amplification region and said absorption region are defined by a pair of additional optically aligned reflecting surfaces optically interposed between said pair of optically aligned reflecting surfaces defining said resonant cavity.

12. A repetitively pulsed chemical oxygen-iodine laser as defined in claim 11 wherein said resonant cavity defines a folded resonator.

13. A repetitively pulsed chemical oxygen-iodine laser as defined in claim 10 wherein said absorption controlling means further comprises a coil of wire for producing said magnetic field and means operably connected to said coil for controlling the strength of said magnetic field.

14. A repetitively pulsed chemical oxygen-iodine laser as defined in claim 13 wherein said amplification region and said absorption region are defined by a pair of additional optically aligned reflecting surfaces optically interposed between said pair of optically aligned reflecting surfaces defining said resonant cavity.

15. A repetitively pulsed chemical oxygen-iodine laser as defined in claim 14 wherein said resonant cavity defines a folded resonator.

* * * * *